M. W. BRINKMANN.
MECHANICAL TOOL SHARPENER.
APPLICATION FILED DEC. 11, 1907.
966,731.
Patented Aug. 9, 1910.
2 SHEETS—SHEET 1.
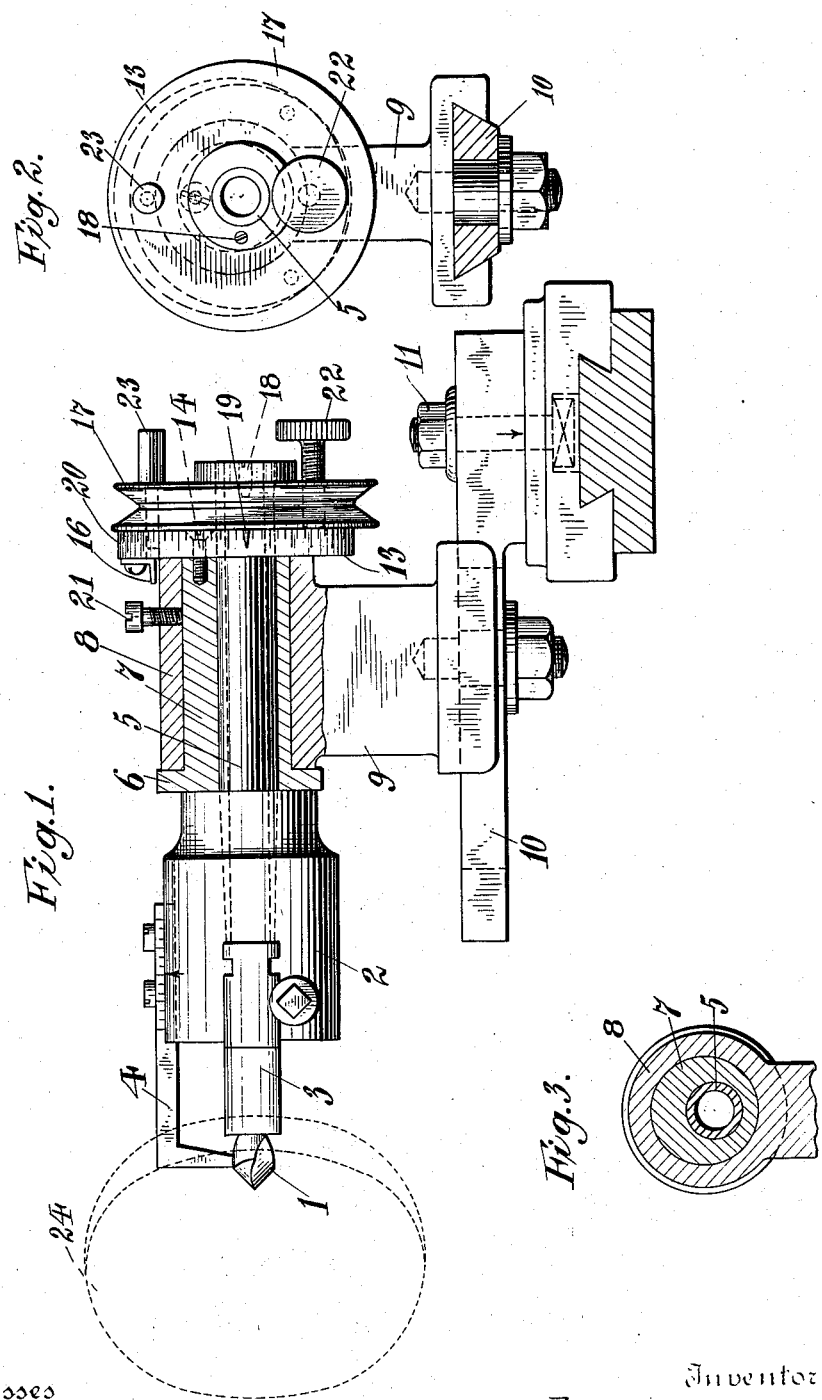

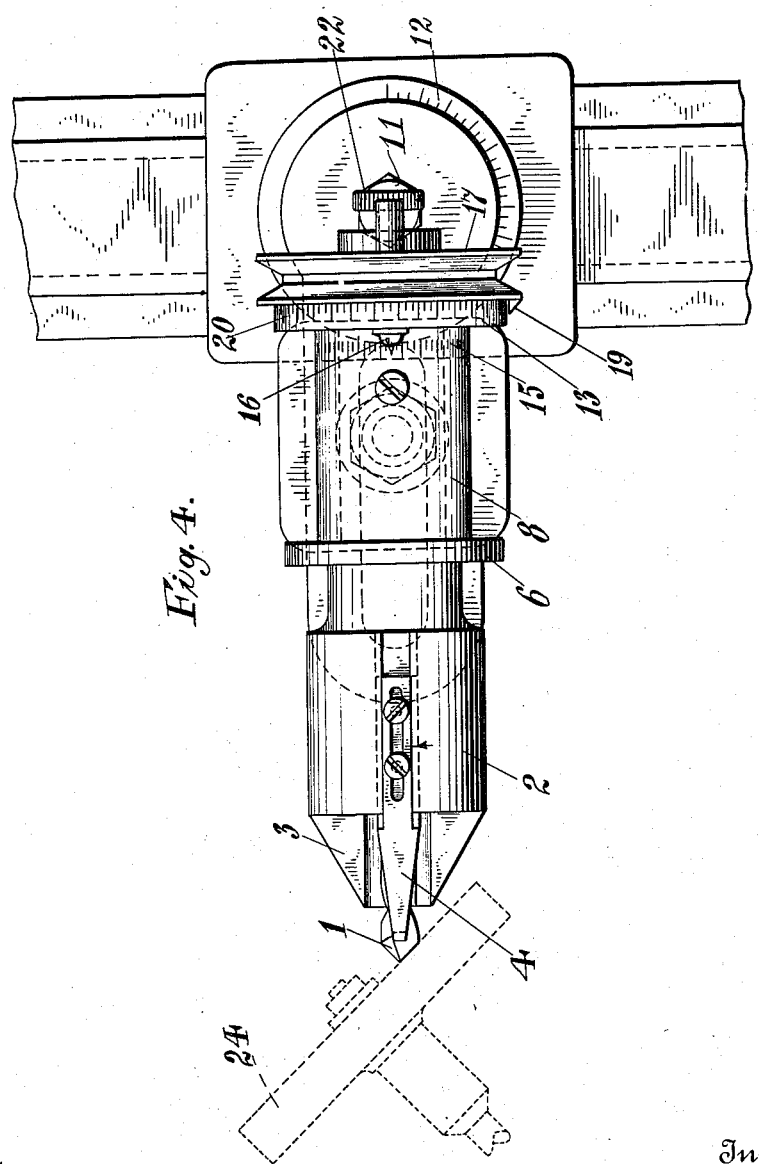

UNITED STATES PATENT OFFICE.

MORRIS W. BRINKMANN, OF NEW YORK, N. Y.

MECHANICAL TOOL-SHARPENER.

966,731.   Specification of Letters Patent.   Patented Aug. 9, 1910.

Application filed December 11, 1907. Serial No. 405,998.

*To all whom it may concern:*

Be it known that I, MORRIS W. BRINKMANN, a citizen of the United States, residing in the borough of Manhattan of the city of New York, in the State of New York, have invented certain new and useful Improvements in Mechanical Tool-Sharpeners, of which the following is a specification, reference being had to the accompanying drawings, forming a part hereof.

The object of my invention is to provide means whereby tools may have their cutting edges ground and sharpened with mathematical accuracy and my invention consists in the new and novel features of construction and combinations of parts hereinafter set forth and claimed.

In the accompanying drawings Figure 1 is a side elevation, partly in section, of my improved sharpener having a tool in place to be ground, the grinder being indicated diagrammatically. Fig. 2 represents an end view of the same. Fig. 3 represents a cross section through the carrier, spindle and a portion of the frame, and Fig. 4 represents a plan view of my improved tool sharpener, the grinder being indicated diagrammatically.

The tool 1 which is to be sharpened is held in a chuck 2 of any well-known or desired construction, preferably one with jaws 3 which project a suitable distance beyond the body of the chuck so as to secure a better hold and provide a firmer support for the tool. A gage 4 is movably mounted on the chuck for the purpose of adjusting the tool, preventing unnecessary waste of material and assisting in holding the tool in position. The chuck is mounted and supported on a hollow spindle 5 which is rotatably mounted in a carrier 6 formed with a bearing 7 for said spindle which is eccentric to the axis of the carrier. The carrier is likewise rotatable in a bearing 8 formed in a suitable frame 9 which is movably mounted upon an arm 10 swiveled in any desired manner as at 11 to the slide rest of a lathe. Preferably the frame or slide rest is provided with graduations 12 so that the angle of the sharpener to said slide rest may be accurately determined.

The carrier is provided with a disk plate, or head 13 which is secured thereto by any suitable means as a screw 14, and the position of the carrier, with relation to the frame, may be accurately determined by suitable graduations or marks 15 provided on said frame and a mark or marks 16 on said plate. The hollow spindle 5 is also provided with a disk, head or plate 17 secured thereto in any suitable manner as by screw 18 and is likewise provided with a mark or graduation 19, adapted to register with corresponding marks or graduations 20 on the plate 13 whereby the position of the spindle, and consequently the tool, may be determined with relation to said carrier, and through the carrier with relation to the frame. If desired the plate 17 may be grooved to receive a belt for the purpose of rotating same. The carrier may be held against rotation in its adjusted position in the frame by suitable means as a set screw 21 and the carrier and spindle may also be held in their adjusted positions with relation to each other by any suitable means as the set screw 22 or pin 23 or both.

In operation, if a twist drill is to be sharpened, the drill is placed in the hollow spindle which will receive a drill of any length and the gage is first adjusted to aline the same and to prevent unnecessary waste of metal. The tool is then arranged at the desired angle with relation to the grinder 24 by means of the graduations on the slide rest of the lathe. The clearance of the cutting edge of the tool is determined by the position of the carrier in its bearing and may be regulated by means of the graduations provided on the plates on the carrier and spindle respectively. After being adjusted the spindle and carrier are secured together and the tool is then advanced by the lathe into contact with the grinder, both the spindle and carrier being rotated slightly until the grinding operation is completed.

In case it is desired to grind a straight-edged tool such as a reamer or the like, the sharpener is arranged at right angles to the slide rest of the lathe so that the cutting edge of the tool will be moved parallel with the face of the grinder. The adjustments are then made as before and the grinding is accomplished in the same manner.

It is obvious also that this device may be used for sharpening tools such as center punches by holding the carrier stationary by means of the set screw and then arranging the tool at the desired angle to the grinder and rotating the spindle. With tools of this class, especially if they be large, the rotation of the spindle may best be accomplished by means of a belt engaging with the plate which is secured directly to the spindle.

It is obvious also that various other changes may be made in the details of the construction herein shown and described without departing from the spirit of the invention provided the means set forth in the following claims be employed.

I claim as my invention:

1. A mechanical tool sharpener comprising an adjustable in any desired direction frame, a carrier mounted in the frame, a hollow spindle to receive the tool to be ground and mounted in the carrier parallel with the axis thereof and noncentric therewith, a gage engaging the point end of the tool to adjust and center the same with relation to the spindle, and means whereby the spindle and tool can be accurately adjusted with relation to the carrier to regulate the degree of eccentricity employed in the grinding operation, substantially as set forth.

2. A mechanical tool sharpener comprising an adjustable frame, a carrier mounted in the frame, a hollow spindle to receive the tool to be ground and mounted in a carrier parallel with the axis thereof and noncentric therewith, means whereby the spindle and tool can be accurately adjusted with relation to the carrier to regulate the degree of eccentricity employed in the grinding operation, means for securing the carrier to the frame, and means for causing independent continuous rotation of the spindle and tool to be ground in the carrier, substantially as set forth.

3. A mechanical tool sharpener comprising a grinder and adjustable frame, a carrier rotatably mounted in the frame, a hollow spindle to receive the tool to be ground rotatable in the carrier and parallel with the axis thereof and noncentric therewith, means whereby the spindle and tool can be accurately adjusted with relation to the carrier means whereby the carrier may be accurately adjusted with relation to the grinder to determine the degree of eccentricity employed in the grinding operation, means on said spindle detachably engaging with the carrier to rotate same when the spindle is rotated, and separate means to rotate said spindle, substantially as set forth.

4. In a mechanical tool sharpener, the combination of a movable frame, a carrier rotatably mounted in said frame and provided with a bearing non-centric therewith, a tool rotatably mounted in said bearing, a grinder, and means for adjusting the point of the tool with relation to the grinder, and to determine the degree of eccentricity employed in the grinding operation, substantially as described.

5. In a mechanical tool sharpener, the combination of a frame, means for adjusting said frame in any desired direction, a carrier rotatably mounted in said frame having a bearing formed therein, means for rotating said carrier, independent means for holding same in its adjusted position, a hollow spindle rotatably mounted in said bearing, a chuck on said spindle adapted to receive the tool to be ground and provided with an adjustable gage to adjust the position of said tool, means for rotating the spindle independently of the carrier, and means for holding the spindle in its adjusted position, substantially as described.

This specification signed and witnessed this 3rd day of December, A. D., 1907.

MORRIS W. BRINKMANN.

Signed in the presence of—
M. C. RIEDLING,
AMBROSE S. O'SHEA.